United States Patent Office 2,941,903
Patented June 21, 1960

2,941,903

MODIFIED POLYMERIC TITANIUM OXIDE FILMS

Anthony Winston, Manor Township, Lancaster County, Pa., assignor to Armstrong Cork Company, Lancaster, Pa., a corporation of Pennsylvania No Drawing. Filed Apr. 21, 1958, Ser. No. 729,497

16 Claims. (Cl. 117—106)

This invention relates to thin, transparent films on solid surfaces and more particularly to thin, transparent films comprising polymeric titanium oxide. Still more particularly the invention relates to a method of placing thin films of polymeric titanium oxide on solid surfaces under high humidity conditions. The invention also relates to a composition suitable for such use.

In U.S. Patent 2,768,909, Haslam, there appears a full description concerning the process of placing polymeric oxide films on solid surfaces. The process contemplates forming alkyl titanates such as propyl titanate, isopropyl titanate, butyl titanate, tertiary butyl titanate, and the like. The general formula for these titanates is $Ti(OR)_4$, wherein R is an alkyl radical containing from 1–8 carbon atoms. These alkyl titanates are formed by well-known methods as, for example, by the reaction of titanium tetrachloride with an alcohol containing the desired alkyl radical, in the presence of ammonia. To form the necessary thin film, the alkyl titanates are deposited on solid surfaces in an amount of about 0.0003 to about 0.0375 gram molecules of the alkyl titanate per square meter of solid surface. Although the alkyl titanate may be applied directly as such to the solid surface, it is preferred to take up the alkyl titanate in a solvent and apply the solution to the solid surface; this latter method has been preferred in actual practice. Once the solution has been applied to the surface, the solvent is allowed to evaporate leaving behind the thin film of the alkyl titanate. The alkyl titanate is then hydrolyzed either by direct contact with water vapor or by mere exposure to atmospheric moisture. Apparently on hydrolysis the alkoxy groups are replaced by hydroxyl groups which, upon aging, interact with the elimination of water to form the insoluble, transparent, flexible adherent, polymeric oxide film.

The solvents to be used should be anhydrous and should be relatively easily volatilized. Suitable solvents include the hydrocarbons such as hexane, cyclohexane, mineral spirits, benzene, toluene, xylene, and others. Additionally there may be used the volatile anhydrous alcohols, particularly those which correspond to the alkyl group in the alkyl titanate. The alkyl titanate is taken up in the volatile anhydrous solvent to form a 0.01 to 0.5 molar solution which may then be brushed, sprayed, doctored, or otherwise applied as by dipping to the solid surface.

The rate of hydrolysis of the alkyl titanate can be controlled within certain limits. The various metal esters vary considerably in their hydrolysis rate in that the esters of the higher molecular weight alcohols hydrolyze more slowly. Additionally use of a hydrocarbon solvent inhibits the absorption of moisture due to its hydrophobic properties and thus slows down the rate of hydrolysis of the metal ester. Thus the conditions under which hydrolysis of any given ester are effected must be carefully controlled and correlated with a composition of the alkyl titanate solution. The humidity, temperature, film thickness, type of ester, and other considerations must be balanced. It is preferred that the hydrolysis be carried out after substantially all the solvent has evaporated, and the rate of such hydrolysis must be slow. Generally speaking this calls for the preparation of the hydrolyzed films in an air-conditioned room where the humidity can be controlled. Once the solvent has evaporated, it is often possible to hydrolyze and heat-cure the film at 100° C. for a few minutes during hydrolysis.

The present invention contemplates curing the titanium film with compounds other than water. The resulting cured films are stable, strongly adherent, flexible, and transparent. The films, however, are not water white but instead possess a clear brownish color. As will be explained below, an unexpected advantage accrues from this color in certain applications.

The invention contemplates applying to a surface a layer of hydrolyzable organic ester of titanium containing from 1–8 carbon atoms per titanium atom. When the applied ester layer has present therein not more than a minor amount of a volatile solvent for the ester, the layer is contacted with vapor of a hydroxyl aromatic compound selected from the group consisting of hydroxy benzenes and hydroxy naphthalenes having no reactive groups thereon under ambient conditions other than hydroxyl groups. The vapor and the ester layer are maintained under reactive conditions until substantial polymerization of the ester on the surface is effected.

The esters are most conveniently applied to the surface to be treated by utilizing a solution of the ester dissolved in a volatile organic solvent therefor. Useful volatile solvents are those contemplated by above-described U.S. Patent 2,768,909. The solvents may be hydrocarbons such as hexane, cyclohexane, mineral spirits, benzene, toluene, xylene, and other high-boiling hydrocarbon solvents. Alternatively the volatile anhydrous alcohols can also be used such as ethanol, isopropanol, butanol, and the like. Mixtures of alcohols and hydrocarbons may be employed. Mixtures are particularly desirable where one constituent of the solvent mixture is a higher boiling solvent such as octanol-2.

The solutions of the titanium esters in solvents therefor may readily be applied to glass, paint, plastic, enamels, rubber, fibers, and the like by any convenient method. Often, dipping will suffice, but the ester layer may be applied by spraying, wiping, or otherwise depositing the ester solution onto the surface by any convenient method. After application, the solution is suitably dried to remove the volatile solvent from the ester layer. Control of the solvent evaporation rate can easily be effected by regulating the temperature employed in the drying step or by utilizing a lower or higher boiling solvent or solvent mixture. Care must be exercised during the drying operation so that formation of the desired continuous adherent film will be obtained. Film thickness will generally run less than one micron and in fact may be conveniently controlled to less than .25 micron by regulating the concentration of the ester in the solvent system. The solvent used will have a substantial vapor pressure within the range of 10°–100° C.; hence drying of the solvent offers no particular problem.

In the prior art the film of the ester layer containing no more than a minor amount of the volatile solvent is contacted with water vapor in order to cure the ester layer. Cure apparently proceeds by hydrolysis of the ester groups followed by polymerization of the remnant of the molecule, all of which results in a final film of polymerized titanium oxide. In the present invention, however, it is important that water be prevented from contacting the ester layer since hydrolysis of the ester layer is to be avoided. In place of the water there is used vapor of a hydroxyl aromatic compound having no reactive groups thereon—under ambient conditions—other than hydroxyl groups. These hydroxyl compounds may be more fully defined as the mono-, di-, tri-, tetra-, and higher hydroxyl benzenes and naphthalenes. The hydroxyl biphenyls are included in the term "hydroxyl benzenes." Other groups, inert under these reaction conditions, may be present on the molecule. Examples of the hydroxyl benzene compounds are hydroxyl benzene (phenol), dihydroxyl benzenes, the 1,3,5-; 1,2,3-; 1,2,4-trihydroxy benzenes, and the tetrahydroxyl benzenes. Examples of the hydroxy naphthalene compounds are the monohydroxyl naphthalenes, the 1,2-; 1,3-; 1,4-; 1,5-; 1,6-; 1,7-; 1,8-; 2,3-; 2,6-; and 2,7-dihydroxy naphthalenes, and the tri-, tetra-, and higher polyhydroxyl naphthalenes.

The hydroxyl aromatic compounds are contacted with the ester layer in the same fashion as was the water vapor in the prior art. The article whose surface is coated with the ester layer containing a minor amount of the solvent may simply be suspended in an atmosphere of the hydroxyl aromatic compound. Such procedure minimizes the possibility of contaminating the final polymeric film with the reaction products resulting from hydrolysis of the ester, although there will always be a small amount of hydrolysis product present. The hydroxyl aromatic compound may be boiled and the resulting vapors impinged by means of a nozzle or other convenient outlet on the surface carrying the ester layer. Alternatively the vapors of the hydroxyl aromatic compounds may be passed into a container in which the articles carrying the ester layer are suspended. Such a container may be at atmospheric, reduced, or elevated pressure. One convenient method for applying the vapors of the hydroxyl aromatic compound entails placing the ester-coated object in a container along with the particular hydroxyl aromatic compound to be used for curing the layer. Application of a vacuum to the container results in evacuation of the air and increase of the vapor concentration of the hydroxyl aromatic compound. If desired heat may be applied to the hydroxyl aromatic compound in order to increase its vapor pressure and by so doing to increase the rate of curing. Heat may even be necessary if compounds possessing extremely low vapor pressures are used.

The resulting cured film possesses all the advantages of the polymeric titanium oxide film resulting from the hydrolysis of the ester layer with water vapor. Additionally the films resulting from the process of the present invention have radiation absorption characteristics. Absorption spectra run on these films show that the films are highly absorbent in the ultraviolet and short visible radiation regions, the particular region being dependent on the particular hydroxyl compound used. No such characteristics are exhibited by films resulting from the water vapor hydrolysis of the titanium esters. Thus the films of the present invention are particularly useful as a coating for glass bottles used to contain substances sensitive to ultraviolet and short visible radiation. Glass jars coated with the films of the present invention are thus particularly suitable for packaging certain foodstuffs, medicinals, chemical compounds, and the like.

The structure of the product films of the present invention is not known with certainty, but they can be said to be aromatic-modified polymeric titanium oxide films.

The following examples illustrate several embodiments of the invention. All parts are by weight unless otherwise stated.

Example I

A solution of tetraisopropyl titanium was prepared by dissolving 2.9 parts of the ester in 43 parts reagent grade xylene and 1.5 parts n-butanol. The resulting solution contains about 6.1% by weight tetraisopropyl titanium.

A clean glass slide was dipped into the solution after which the solvent was evaporated by drying the ester layer at 25° C. for one minute. The glass slide with the dried ester layer thereon was placed in a container along with about one-half parts hydroquinone. The container was sealed and a vacuum of about 0.5 mm. of mercury was produced in the container. During this process the film darkened to a light brown color. After about three minutes in the container the vacuum was broken and the film was examined. The film was found to be hard, continuous, adherent, and insoluble in both inorganic and organic solvents, and yellowish brown in color.

Example II

Example I was repeated save that the following compounds were used in place of the hydroquinone: Phenol, catechol; resorcinol; pyrogallol; beta-napthol; 1,6-naphthalenediol; and 4,4'-dihydroxy-3,3'-dimethylbiphenyl. In several cases, such as phenol and 1,6-naphthalenediol, the container was heated carefully with a free flame; this produced a more adherent film. The strongly adherent films were yellow to red-orange.

I claim:
1. The method of coating a solid surface with an insoluble, flexible, adherent film comprising a polymeric oxide, which method comprises applying to said surface a layer of hydrolyzable organic ester of titanium containing from 1–8 carbon atoms per titanium atom and contacting the applied ester layer while having present therein no more than a minor amount of a volatile solvent for said ester with vapor of a hydroxyl aromatic compound selected from the group consisting of hydroxyl benzenes and hydroxyl naphthalenes until substantial polymerization of said ester on said surface is effected.

2. The method according to claim 1 wherein said hydroxyl aromatic compound is selected from the group consisting of polyhydroxyl benzenes and polyhydroxyl naphthalenes.

3. The method according to claim 1 wherein said titanium ester comprises tetraisopropyl titanium.

4. The method according to claim 1 wherein said applied ester layer is less than one micron in thickness.

5. The method of coating a solid surface with an insoluble, flexible, adherent film of a titanium polymer which comprises forming a solution of a titanic acid ester having the formula $Ti(OR)_4$, wherein R is an alkyl radical containing 1–8 carbon atoms to form a 0.01 to 0.3 molar solution in a volatile organic solvent, applying the resulting solution as a thin layer over said surface in an amount ranging from about 0.0003 to 0.0375 gram molecules of ester per square meter of surface, evaporating the solvent from the applied coating under substantially anhydrous conditions, and contacting the applied ester layer, while having present therein not more than a minor amount of a volatile solvent for said ester, with vapor of a hydroxyl aromatic compound selected from the group consisting of hydroxyl benzenes and hydroxyl naphthalenes until substantial copolymerization of said ester and said aromatic compound on said surface is effected.

6. The method according to claim 5 wherein said titanium ester comprises tetraisopropyl titanium.

7. The method according to claim 5 wherein said hydroxyl aromatic compound comprises catechol.

8. The method according to claim 5 wherein said hydroxyl aromatic compound comprises hydroquinone.

9. The method according to claim 5 wherein said hydroxyl aromatic compound comprises resorcinol.

10. A flexible adherent film supported on a solid surface comprising the reaction product of a titanic acid ester having the formula $Ti(OR)_4$, wherein R is an alkyl radical containing from 1–8 carbon atoms with vapor of a hydroxyl aromatic compound selected from the group consisting of hydroxyl benzenes and hydroxyl naphthalenes, said film being not more than about one micron thick and being substantially insoluble in organic solvents and water.

11. An article according to claim 10 wherein said titanium ester comprises tetraisopropyl titanium.

12. An article according to claim 10 wherein said titanium ester comprises tetrabutyl titanium.

13. An article according to claim 10 wherein said titanium ester comprises ethyl-hexyl titanium.

14. An article according to claim 10 wherein said hydroxyl aromatic compound comprises catechol.

15. An article according to claim 10 wherein said hydroxyl aromatic compound comprises resorcinol.

16. An article according to claim 10 wherein said hydroxyl aromatic compound comprises hydroquinone.

References Cited in the file of this patent

UNITED STATES PATENTS

| | | |
|---|---|---|
| 2,614,112 | Boyd | Oct. 14, 1952 |
| 2,621,195 | Haslam | Dec. 9, 1952 |
| 2,710,267 | Boyd et al. | June 7, 1955 |
| 2,720,468 | Shacklett | Oct. 11, 1955 |
| 2,768,909 | Haslam | Oct. 30, 1956 |

OTHER REFERENCES

Esters of Titanium from "Paper Manufacture," December 1956 (pages 463–466 relied upon).